United States Patent [19]

Busico et al.

[11] Patent Number: 5,565,532

[45] Date of Patent: Oct. 15, 1996

[54] PROCESS FOR PRODUCING HIGHLY AMORPHOUS PROPYLENE POLYMERS

[75] Inventors: Vincenzo Busico, Naples; Wigi De Martino, Casena, both of Italy

[73] Assignee: Dureco Chemicals, Inc., Yorktown Heights, N.Y.

[21] Appl. No.: 462,452

[22] Filed: Jun. 5, 1995

Related U.S. Application Data

[63] Continuation of Ser. No. 167,640, Dec. 14, 1993, abandoned, which is a continuation of Ser. No. 13,119, Feb. 1, 1993, abandoned, which is a continuation of Ser. No. 927,777, Aug. 10, 1992, abandoned, which is a continuation of Ser. No. 609,916, Nov. 6, 1990, abandoned.

[51] Int. Cl.$^6$ ............................ C08F 4/631; C08F 4/633; C08F 110/06
[52] U.S. Cl. ............................................ 526/114; 526/351
[58] Field of Search ................................................ 526/114

[56] References Cited

U.S. PATENT DOCUMENTS

| | | | |
|---|---|---|---|
| 3,789,036 | 1/1974 | Tingi et al. | 526/114 |
| 4,191,816 | 3/1980 | Columberg | 526/114 |
| 4,317,897 | 3/1982 | Herrmann et al. | 526/351 |
| 4,335,225 | 6/1982 | Collette et al. | 526/351 |
| 4,524,195 | 6/1985 | Martin | 526/114 |

FOREIGN PATENT DOCUMENTS

| | | | |
|---|---|---|---|
| 1335887 | 10/1973 | United Kingdom | 526/114 |

OTHER PUBLICATIONS

Boor Ziegler–Natta Catalyts and Polymeriezations. Academic Res N.Y. (1979) pp. 472–473.

*Primary Examiner*—Edward J. Smith
*Attorney, Agent, or Firm*—Kenyon & Kenyon

[57] ABSTRACT

The invention disclosed herein includes a process for producing highly amorphous polypropylene and a highly amorphous polypropylene produced by this process comprising contacting propylene with (1) a catalyst comprising a titanium compound supported on a rare earth halide and (2) a metal alkyl cocatalyst wherein the metal is selected from the group consisting of groups II and III of the Periodic Table under conditions for producing a highly stereo- and regio-irregular amorphous propylene polymer.

20 Claims, No Drawings

PROCESS FOR PRODUCING HIGHLY AMORPHOUS PROPYLENE POLYMERS

This is a continuation of Ser. No. 08/167,640 filed on Dec. 14, 1993, which is a continuation of Ser. No. 08/013,119 filed on Feb. 1, 1993, which is a continuation of Ser. No. 07/927,777 filed on Aug. 10, 1992, which is a continuation of 07/609,916 filed Nov. 6, 1990, all now abandoned.

BACKGROUND OF THE INVENTION

Atactic or amorphous polypropylene (APP), as used herein, is a substantially stereo-irregular, non-crystalline propylene polymer.

For years, APP has received attention in the polypropylene industry solely because of the difficulties created by its presence as a byproduct in the polymerization of propylene to isotactic polypropylene (IPP). In fact, APP was once regarded as a disposal problem, rather than as a marketable byproduct. Since the discovery of polypropylene, research efforts have therefore focused exclusively on the elimination of the unwanted APP byproduct from IPP production processes. These efforts have been successful and current catalyst technologies reduce APP output to levels where its separation from the IPP product by solvent extraction is unnecessary.

Ironically, however, within the last ten years, APP has gained a considerable market in the United States and abroad. Its uses range from mixing with bitumen to produce modified asphalt used in roofing materials and road paving, to adhesives, paper laminating and cable flooding. Today, APP is no longer a disposal problem. Rather, as the most advanced catalyst technologies for IPP production steadily replace the old, APP is quickly becoming a problem of severe shortage.

SUMMARY OF THE INVENTION

The object of this invention is to develop a process for the direct synthesis of highly stereo- and regio-irregular as well as highly non-crystalline propylene polymers. Propylene polymers containing a substantial portion of APP have been produced using traditional Ziegler-Natta catalysts. The APP polymers obtained after separation from the IPP byproduct are rather stereo-irregular but are also highly regio-regular and partially crystalline (15–25%). It has now been discovered that a propylene polymer which is both highly stereo- and regio-irregular as well as completely amorphous can be synthesized directly and without any IPP fraction by polymerizing propylene in the presence of a catalyst of the type disclosed in U.S. Pat. No. 4,524,195 to J. L. Martin. The invention disclosed herein requires that propylene be polymerized, preferably in bulk, in the presence of (1) a high yield catalyst comprising a titanium halide supported on a rare earth metal halide, preferably neodymium trichloride or praesydium trichloride or a mixture thereof, and (2) a metal alkyl compound wherein the metal is selected from the group consisting of groups II and III of the Periodic Table. The process of the invention produces a substantially amorphous polypropylene having an X-ray crystallinity less than 5%, and which is soluble in boiling n-heptane.

Another aspect of this invention is the ease with which the molecular weight of the resulting polymer can be regulated by the introduction of the small amounts of molecular hydrogen during the reaction. By varying the partial pressure of the molecular hydrogen in the limited range of 0.01 to 1 bar, but preferably 0.1 to 0.5 bar, the molecular weight of the resulting polymers can be varied from that typical of a high molecular weight polymer to that typical of a wax. Such variations in molecular weight can be obtained with conventional and high yield Ziegler-Natta catalysts only be applying partial pressures of molecular hydrogen exceeding 10 bar.

DETAILED DESCRIPTION OF THE INVENTION

The catalyst may be prepared by the method described in U.S. Pat. No. 4,524,195, the disclosure of which is incorporated herein by reference. It is produced by (1) using an organophosphate or organophosphoramide to dissolve a metal halide, selected from the group consisting of the completely halogenated halides of rare earth metals having atomic numbers 57 to 71, in a dry (non-aqueous) organic liquid; and then (2) reacting the thus obtained solution with a halogen of a transition metal to produce the solid catalyst.

Suitable titanium compounds include the titanium halides and titanium alkoxides having 1–4 carbon atoms, preferably $TiCl_4$. Suitable organo phosphate include the trialkyl phosphates having 1–10 carbon atoms, preferably tri-n-butyl phosphate. Suitable solvents include any inert organic solvent, preferably an aliphatic hydrocarbon having 4–8 carbon atoms.

A titanium tetrachloride catalyst supported on neodymium trichloride is surprisingly effective, with the aid of an aluminum alkyl cocatalyst, preferably a tri-alkyl aluminum such as tri-ethyl aluminum, in producing an APP of negligible crystallinity. Such a catalyst can be formed by (1) using tri-n-butyl-phosphates to dissolve anhydrous $NdCl_3$ in a dry organic solvent; and then (2) reacting this solution with $TiCl_4$.

A $TiCl_4$ catalyst supported on praesydium trichloride which can be produced in the manner described above with the aid of cocatalysts described above, is also effective in producing an APP of negligible crystallinity. Similarly, a $TiCl_4$ catalyst supported on a mixture of $NdCl_3$ and $PrCl_3$ can be used to obtain the desired amorphous propylene polymer.

The polymerization of propylene in the presence of the catalysts and cocatalysts described above can be undertaken in an inert hydrocarbon solvent such as heptane. However, as shown by example 2, below, the catalyst's activity is low. A much higher catalytic activity is obtained when the polymerization is undertaken in liquid propylene monomer, that is, in bulk.

The polymerization in liquid propylene monomer must be carried out under an inert atmosphere at a temperature in the range of 20° C. to 90° C., preferably 50° C. to 70° C., and a corresponding pressure in the range of 1 bar to 35 bar, preferably 15 bar to 25 bar.

As illustrated in Example 8, below, the catalyst's activity may be significantly increased by the introduction during the reaction of small amounts of ethylene. By limiting the quantity of ethylene introduced to a range of 0.01 to 5 mol %, preferably 1–3% one can obtain a polymer with physical and chemical characteristics almost identical to the amorphous propylene polymer obtained by the homopolymerization of propylene in the presence of the catalyst described. The introduction of a larger amount of ethylene during the reaction may result in a product having an appreciable crystallinity due to the formation of ethylene homopolymer, as well as ethylenepropylene copolymer and propylene homopolymer. In fact, it is believed that the catalyst described in this invention has more than one type of active site and could therefore be used also for the direct synthesis of polymer blends by following the same procedure set forth herein for propylene, i.e., polymerizing mixtures of ethylene and propylene and/or other lower olefins to produce mixtures of polyethylene, polypropylene and/or polymers of other lower olefins.

The molecular weight of the final polymer product can be effectively regulated by introducing molecular hydrogen during the reaction. This is illustrated by examples 4–7, below. Products ranging from polymers of $M_v$ greater than $10^5$ during the reaction. This is illustrated by examples 4–7, a.m.u. (atomic mass units) to waxes of $M_v$ less than $10^4$ a.m.u. can be obtained by varying the $H_2$ pressure in the limited range of about 0.01 to 1 bar.

The present invention is explained more fully by the following examples which are intended only to illustrate the preferred embodiments of the invention and are not in any way intended to limit the scope thereof.

under argon in a glass vial, was placed in a vial holder/breaker; after charging the reactor with solvent (when used), cocatalyst (in n-heptane solution) and monomer, and heating to the desired temperature, the reaction was started by breaking the catalyst-containing vial, and then stopped by quick monomer degassing.

Productivities of up to 1,000 g. of polymer per gram of catalyst were obtained for polymerization in liquid monomer.

The resulting polypropylenes appeared as white, sticky, rubbery materials, and turned out to be practically amorphous (X-ray crystallinity of less than 5% and completely soluble in hexane).

The polymerizations and the pertinent characteristics of the resulting polymers are summarized in Table 1, below.

EXAMPLE 9

By following the above procedure using $PrCl_3$ in the place of $NdCl_3$ comparable results would be obtained.

TABLE I

| Example no. | Catalyst (mg) | Solvent | Monomer | Hydrogen (bar) | Temperature (0°C.) | Reaction time (min) | Polymer yield (g) | [n] (dl/g) | <Rp>[a] | X-ray Crystallinity (%) | I.I (%)[b] |
|---|---|---|---|---|---|---|---|---|---|---|---|
| 2 | 146 | n-Heptane, 300 ml | 4.5 bar (gas) | — | 60 | 180 | 10 | | 0.2 | <5 | 0 |
| 3 | 107 | — | 470 g (liquid) | — | 60 | 60 | 70 | | 1.2 | <5 | 0 |
| 4 | 114 | — | 380 g (liquid) | — | 50 | 180 | 250 | 1.06 | 1.3 | <5 | 0 |
| 5 | 131 | — | 380 g (liquid) | 0.1 | 50 | 170 | 260 | 0.89 | 1.2 | <5 | 0 |
| 6 | 160 | — | 380 g (liquid) | 0.2 | 50 | 150 | 210 | 0.75 | 1.0 | <5 | 0 |
| | 134 | — | 360 g (liquid) | 0.5 | 50 | 180 | 290 | 0.32 | 1.3 | <5 | 0 |
| 8 | 111 | — | 500 g (liquid) + 20 g ethylene | — | 60 | 60 | 130 | | 2 | <5 | 0 |

[a]Mean Polymerization rate, expressed as g(polymer)/(mg(Ti) · h · bar(monomer))
[b]g % insoluble in boiling n-heptane

EXAMPLE 1

Catalyst Preparation

All manipulations were carried out under an argon atmosphere. Anhydrous $NdCl_3$, 2.0 g., was introduced into a 250 ml. glass reactor and suspended in a n-heptane, 30 ml. Tri-n-butylphosphate (previously dried over activated alumina) 10 ml., was added dropwise, while stirring, to the suspension, which was then heated to reflux for 2 hours, cooled to room temperature and filtered. To the pale blue filtrate, 20 ml. of $TiCl_4$ were added dropwise while stirring, and the solution was heated to 100° C. for 2 hours, during which period a yellowish solid progressively separated out. The solid was hot-filtered, washed repeatedly with n-heptane at 80° C. and vacuum dried. Yield 2.5 g. The elemental analyses gave the following results: Ti 3.2 weight %; Cl 32 weight %.

EXAMPLES 2–8

Propylene Polymerizations

All polymerizations were carried out in a 2 l. stainless steel magnetically stirred (1000 rpm) reactor under nitrogen atmosphere, using Al $(C_2H_5)_3$ as the cocatalyst (Al/Ti mole ratio=100/200). Prior to each run, the catalyst sample, sealed

We claim:

1. A process comprising contacting propylene with (1) a catalyst formed by dissolving a rare earth metal halide together with an organophosphate or organophosphoramide in an inert organic solvent and reacting the thus obtained solution with a titanium halide and (2) a metal alkyl cocatalyst wherein the metal is selected from the group consisting of groups II and III of the Periodic Table, under conditions for producing an amorphous propylene polymer having an X-ray crystallinity less than 5%.

2. The process described in claim 1 wherein said rare earth metal halide is selected from the group consisting of $NdCl_3$, $PrCl_3$, and mixtures thereof.

3. The process described in claim 2 wherein said rare earth metal halide is $NdCl_3$.

4. The process described in claim 1 wherein said titanium halide is $TiCl_4$.

5. The process described in claim 1 wherein said organophosphate is a tri-alkyl phosphate having 1–10 carbon atoms.

6. The process described in claim 5 wherein said tri-alkyl phosphate is tri-n-butyl phosphate.

7. The process described in claim 1 wherein said inert organic solvent is an aliphatic hydrocarbon having 4 to 8 carbon atoms per molecule.

8. The process described in claim 1 wherein said polymerization is carried out without a solvent in liquid propylene.

9. The process described in claim 1 wherein molecular hydrogen is added to the reaction mixture to control the molecular weight of the resulting polymer.

10. The process described in claim 1 wherein ethylene is added in quantities small enough so as not to result in a product containing an appreciable amount of ethylene homopolymer.

11. A process comprising contacting propylene with (1) a catalyst formed by dissolving a rare earth metal halide together with an organophosphate or organophosphoramide in an inert organic solvent and reacting the thus obtained solution with a titanium halide and (2) a metal alkyl cocatalyst wherein the metal is selected from the group consisting of groups II and III of the Periodic Table, wherein said contacting occurs under conditions for producing a completely amorphous propylene polymer.

12. The process described in claim 11 wherein said rare earth metal halide is selected from the group consisting of $NdCl_3$, $PrCl_3$, and mixtures thereof.

13. The process described in claim 12 wherein said rare earth metal halide is $NdCl_3$.

14. (New) The process described in claim 11 wherein said titanium halide is $TiCl_4$.

15. The process described in claim 11 wherein said organophosphate is tri-alkyl phosphate having 1–10 carbon atoms.

16. The process described in claim 15 wherein said tri-alkyl phosphate is tri-n-butyl phosphate.

17. The process described in claim 11 wherein said inert organic solvent is an aliphatic hydrocarbon having 4 to 8 carbon atoms per molecule.

18. The process described in claim 11 wherein said polymerization is carried out without a solvent in liquid propylene.

19. The process described in claim 11 wherein molecular hydrogen is added to the reaction mixture to control the molecular weight of the resulting polymer.

20. The process described in claim 11 wherein ethylene is added in quantities small enough so as not to result in a product containing an appreciable amount of ethylene homopolymer.

* * * * *

UNITED STATES PATENT AND TRADEMARK OFFICE
CERTIFICATE OF CORRECTION

PATENT NO. : 5,565,532
DATED : October 15, 1996
INVENTOR(S) : Busico et al

It is certified that error appears in the above-indentified patent and that said Letters Patent is hereby corrected as shown below:

Column 1

> Line 56, change "praesydium" to --praseodymium--.
> Line 64, delete the second occurrence of "the".

Column 2

> Line 4, delete "be" and insert --by--.
> Line 32, delete "phosphates" and insert --phosphate--.
> Line 35, change "praesydium" to --praseodymium--.

Column 3

> Line 12, delete "during the reaction. This is illustrated by examples 4-7".

UNITED STATES PATENT AND TRADEMARK OFFICE
CERTIFICATE OF CORRECTION

PATENT NO. : 5,565,532

DATED : October 15, 1996

INVENTOR(S) : Busico et al

It is certified that error appears in the above-indentified patent and that said Letters Patent is hereby corrected as shown below:

On the title page: Item [75] Inventors:

Change "Wigi DeMartino" to --Luigi De Martino--

Change "Casena" to --Casoria--

Other Publications:
Change "Res" to --Press--.

Signed and Sealed this

First Day of April, 1997

Attest:

BRUCE LEHMAN

Attesting Officer

Commissioner of Patents and Trademarks